(12) United States Patent
Kobayashi et al.

(10) Patent No.: US 8,976,946 B2
(45) Date of Patent: Mar. 10, 2015

(54) COMMUNICATION APPARATUS

(71) Applicant: Sharp Kabushiki Kaisha, Osaka-shi, Osaka (JP)

(72) Inventors: Sho Kobayashi, Osaka (JP); Hirotoshi Ohkubo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/230,266

(22) Filed: Mar. 31, 2014

(65) Prior Publication Data

US 2014/0355747 A1    Dec. 4, 2014

(30) Foreign Application Priority Data

Jun. 3, 2013  (JP) ................. 2013-116692

(51) Int. Cl.
*H04M 11/00*    (2006.01)
*H04M 3/42*     (2006.01)

(52) U.S. Cl.
CPC ................. *H04M 3/42042* (2013.01)
USPC ............ 379/100.01; 379/100.08; 358/400; 358/402

(58) Field of Classification Search
USPC ............... 379/93.24, 100.01, 100.08, 127.01, 379/142.06; 358/400, 402
See application file for complete search history.

(56) References Cited

U.S. PATENT DOCUMENTS

| 2005/0282578 A1 | 12/2005 | Vander Veen et al. |
| 2008/0130060 A1 | 6/2008 | Gotou et al. |

FOREIGN PATENT DOCUMENTS

| JP | 2000-201225 A | 7/2000 |
| JP | 2003-244312 A | 8/2003 |
| JP | 2008-178073 A | 7/2008 |
| JP | 2008-283703 A | 11/2008 |
| JP | 2010-272967 A | 12/2010 |

*Primary Examiner* — Creighton Smith
(74) *Attorney, Agent, or Firm* — Keating & Bennett, LLP

(57) ABSTRACT

A communication apparatus includes a communication portion for communicating with an external device, a transmitter information acquiring portion for acquiring predetermined transmitter information for identifying the transmitter at a time of an incoming call of communication, a storage portion for storing a registered name in association with the transmitter information in advance, a registered name retrieval portion for, retrieving the registered name stored in the storage portion so as to be associated with the acquired transmitter information, a common part extraction portion for, in a case where a plurality of registered names are retrieved with respect to the acquired transmitter information when the registered name is retrieved by the registered name retrieval portion, extracting a common part among the plurality of registered names, and an output portion for outputting the common part of the registered names which is extracted by the common part extraction portion, in a predetermined system.

5 Claims, 3 Drawing Sheets

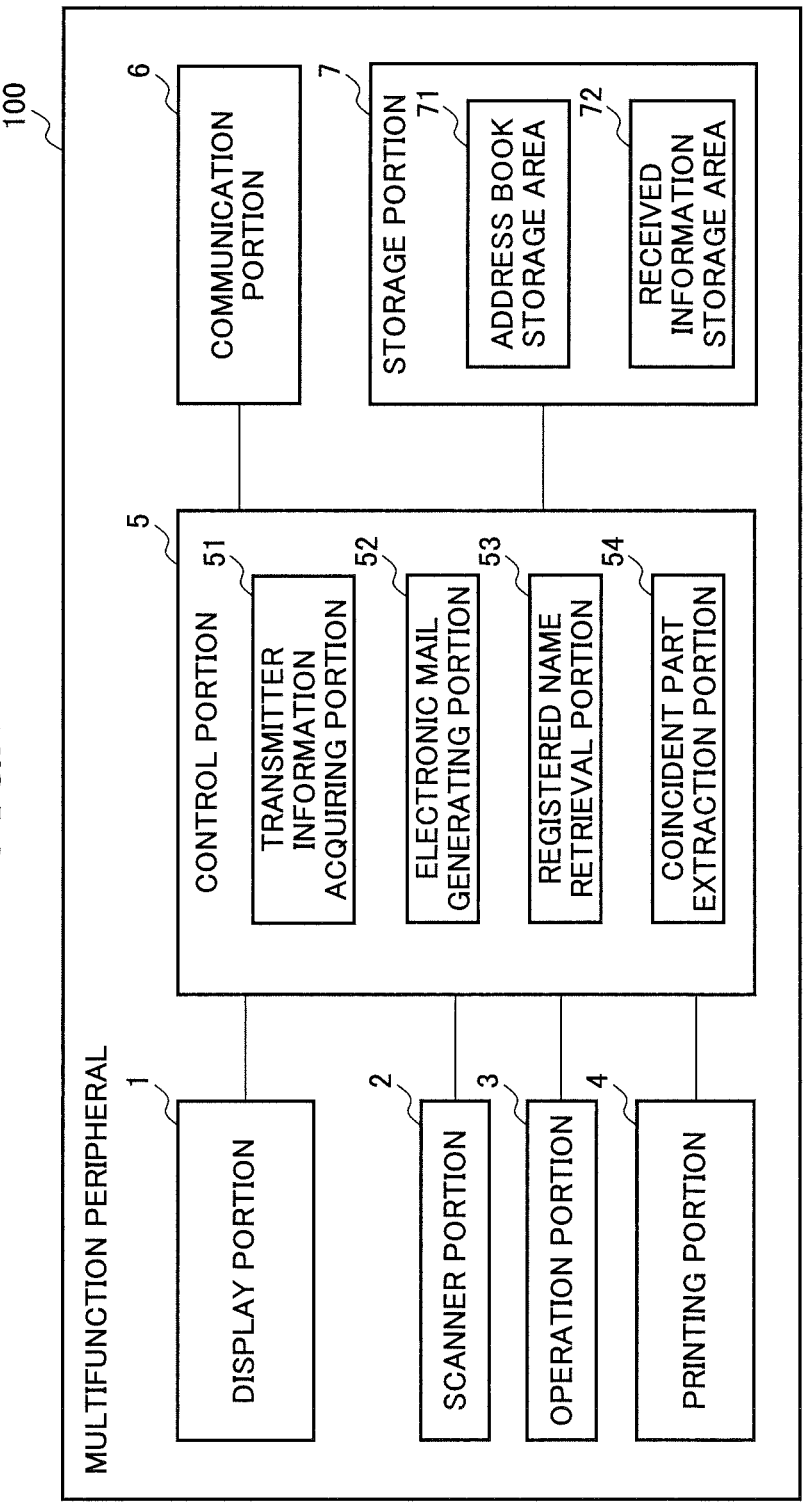

FIG.2

| No. | REGISTERED NAME | NUMBER |
|---|---|---|
| 01 | cc COMPANY aa SECTION | 1112223334 |
| 02 | aa COMPANY cc SECTION Mr./Ms. AA | 0123456789 |
| 03 | aa COMPANY cc SECTION Mr./Ms. CC | 0123456789 |
| 04 | aa COMPANY bb SECTION Mr./Ms. FF dd COMPANY | 0123456789 |
| 05 | aa COMPANY Mr./Ms. GG | 0123456789 |
| 06 | aa COMPANY dd BRANCH | 4445556667 |
| 07 | bb COMPANY | 3334445556 |
| 08 | dd COMPANY | 2223334445 |
| 09 | Mr./Ms. BB | 5556667778 |

FIG.3

TRANSMITTER: xxxx@mfp

SUBJECT: TRANSFERRED IMAGE - From: aa COMPANY (0123456789)

ATTACHMENT: (IMAGE)

- INSTALLATION PLACE: LIVING ROOM
- FILE FORMAT: PDF
- RESOLUTION: 204dpi × 98dpi
- TELEPHONE NUMBER OF TRANSMITTER: 0123456789
- REGISTERED NAME IN ADDRESS BOOK:
  aa COMPANY cc SECTION Mr./Ms. AA
  aa COMPANY cc SECTION Mr./Ms. CC
  aa COMPANY bb SECTION Mr./Ms. FF
  aa COMPANY Mr./Ms. GG

COMMUNICATION APPARATUS

CROSS-NOTING PARAGRAPH

This non-provisional application claims priority under 35 U.S.C. §119(a) on Patent Application No. 2013-116692 filed in JAPAN on Jun. 3, 2013, the entire contents of which are hereby incorporated herein by reference.

FIELD OF THE INVENTION

The present invention relates to a communication apparatus, and more specifically to a communication apparatus to acquire information of a transmitter to perform retrieval in an address book at a time of an incoming call of communication from an external device for outputting the retrieval result so as to be capable of being determined by a receiver.

BACKGROUND OF THE INVENTION

As transmitter information with which a transmitter is able to be identified upon communication using a telephone line or the like, service of notifying a receiver of a telephone number has been provided. As such service, there has been one that displays the telephone number of the transmitter on a communication apparatus of the receiver side, however, a user of the receiver side does not attain to a grasp of a name of the transmitter only by simply displaying the telephone number of the transmitter on the communication apparatus of the receiver side.

Against this, for example, Japanese Laid-Open Patent Publication No. 2003-244312 discloses a technology with which retrieval is performed in an address book based on a telephone number of a transmitter which is obtained at a time of an incoming call to display a registered name which is registered in the address book.

As described above, there is one for registering the telephone number of the transmitter and the registered name thereof in the address book to perform retrieval in the address book for displaying the registered name. In this case, there is a case where, even when registered names are different, a common telephone number such as a representative telephone number of a company and a telephone number shared among a plurality of sections of a company is registered in the address book, for example. In this case, with respect to the telephone number acquired at the time of the incoming call, a plurality of registered names are to be registered in the address book.

In such a case, in the technology of Japanese Laid-Open Patent Publication No. 2003-244312, among the plurality of registered names registered with respect to the telephone number acquired at the time of the incoming call, a registered name which is registered first in the address book is to be displayed or all of the plurality of registered names which are registered for the telephone number are to be displayed.

In the case of displaying the registered name which is registered first in the address book, transmission may be performed actually by a transmitter other than the displayed registered name, so that erroneous information is to be provided to a receiver, in this case. Moreover, in the case of displaying all of the plurality of names registered for the same telephone number, determination of identification of the transmitter is to be entrusted to the receiver, so that information which enables identifying the transmitter reliably at first sight is not able to be provided.

SUMMARY OF THE INVENTION

The present invention aims to provide a communication apparatus capable of outputting only reliable information to a receiver without giving erroneous information even in a case where a plurality of names are registered with respect to transmitter information.

An object of the present invention is to provide a communication apparatus, comprising: a communication portion for communicating with an external device; a transmitter information acquiring portion for acquiring predetermined transmitter information for identifying a transmitter at a time of an incoming call of communication; a storage portion for storing a registered name in association with the transmitter information in advance; a registered name retrieval portion for, based on the transmitter information acquired by the transmitter information acquiring portion at the time of the incoming call of the communication, retrieving the registered name stored in the storage portion corresponding to the acquired transmitter information; a common part extraction portion for, in a case where a plurality of registered names are retrieved with respect to the transmitter information acquired by the transmitter information acquiring portion when the registered name is retrieved by the registered name retrieval portion, extracting a common part among the plurality of registered names; and an output portion for outputting the common part of the registered names which is extracted by the common part extraction portion, in a predetermined system.

Another object of the present invention is to provide the communication apparatus, wherein the transmitter information is telephone number information or address information included in information transmitted through the communication.

Another object of the present invention is to provide the communication apparatus, wherein the output portion outputs all of the registered names retrieved by the registered name retrieval portion together with the common part extracted by the common part extraction portion.

Another object of the present invention is to provide the communication apparatus, wherein the output portion outputs information including the common part among the registered names to a predetermined destination by using an electronic mail.

Another object of the present invention is to provide the communication apparatus, wherein the output portion causes a predetermined display portion to display and output the information including the common part among the registered names.

BRIEF DESCRIPTION OF THE DRAWINGS

FIG. 1 is a block diagram showing an embodiment of a communication apparatus according to the present invention;

FIG. 2 is a view explaining an example of an address book used by the communication apparatus according to the present invention;

FIG. 3 is a view showing an example of an electronic mail generated by the communication apparatus according to the present invention.

PREFERRED EMBODIMENTS OF THE INVENTION

Figure 4:
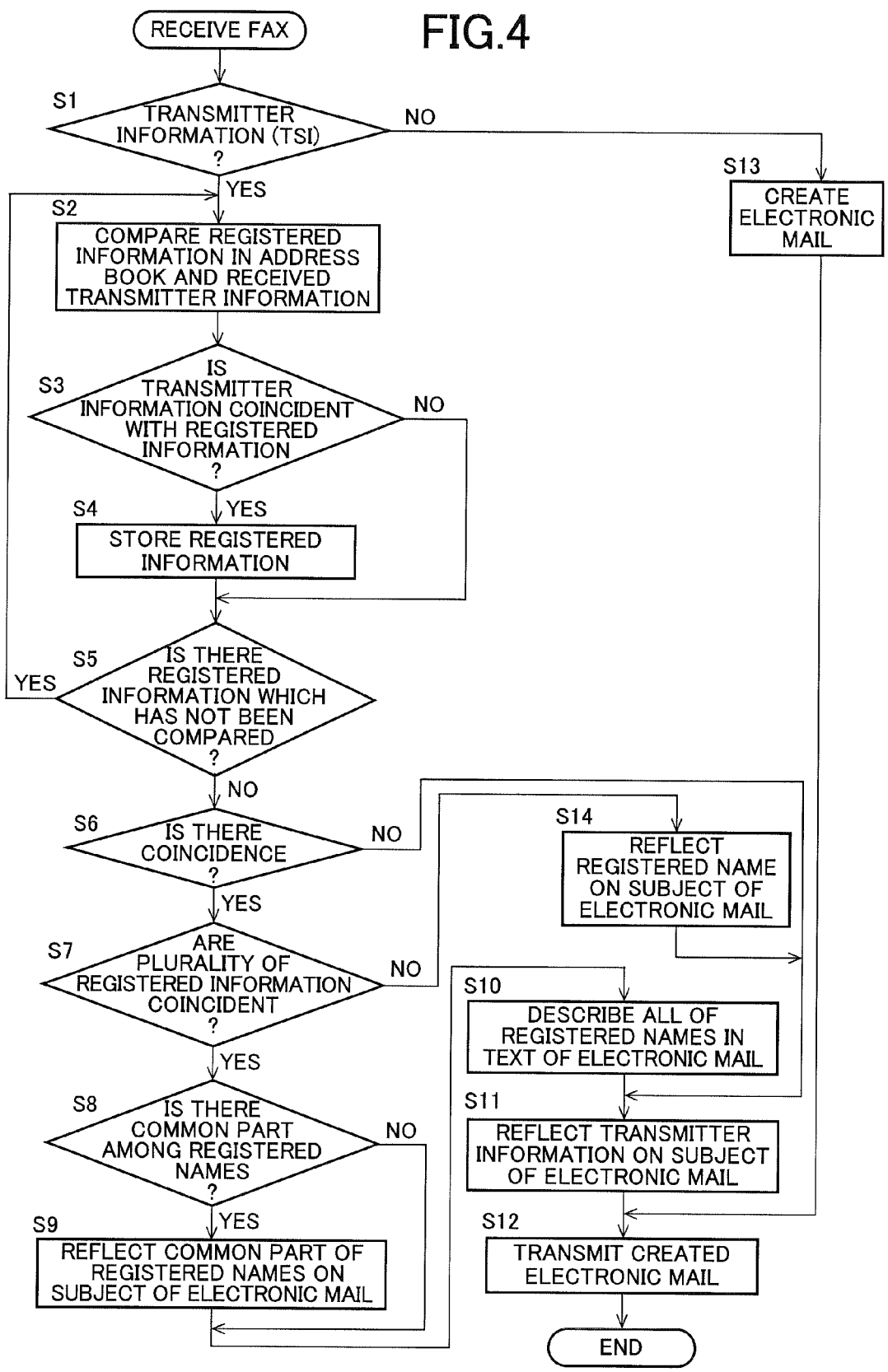
FIG. 4 is a flowchart for explaining an example of processing in the communication apparatus according to the present invention.

FIG. 1 is a block diagram showing an embodiment of a communication apparatus according to the present invention, which shows an example that the communication apparatus according to the present invention is configured as a multifunction peripheral (MFP).

In a multifunction peripheral 100, a display portion 1 is configured by using a liquid crystal panel or the like to display and output various information. For example, upon setting of various setting values by operation with respect to an operation portion 3, selection items are displayed, preview display of an image of a document read by a scanner portion 2 is performed, and registered names registered in an address book are displayed in a list.

The scanner portion 2 has a function for optically reading a document to output as image data. The scanner portion 2 is able to include a light source which irradiates light on the document, an optical system, such as a lens and a mirror, for forming an image on a line image with reflection light from the document, an image sensor which receives the reflection light from the document to read a document image, a conversion portion which performs digital conversion for an analogue image signal output from the image sensor and the like, for example.

The operation portion 3 is composed of various hard keys and a transparent touch panel provided so as to be superimposed on the display portion 1, and the transparent touch panel is able to be caused to function as a soft key for selecting icons, buttons and the like displayed on the display portion 1.

A printing portion 4 has a function for printing image data output from a control portion 5 on a sheet. For example, the printing portion 4 includes a sheet conveyance device, a photoreceptor drum, a charging device, a laser unit, a developing device, a transfer separating device, a cleaning device, a fixing device and the like, which is configured so as to perform image formation in an electrophotographic process. Alternatively, it may be one that performs printing in another system such as a laser printer.

A communication portion 6 has a function for performing communication with an external device, which allows facsimile (FAX) communication through a telephone line, data communication such as transmitting and receiving an electronic mail through a network such as a LAN and the internet and the like.

The control portion 5, which is for controlling the entire of the multifunction peripheral 100, includes a ROM (Read Only Memory) in which a control program is stored and a RAM (Random Access Memory) used for temporary storage of a working area and data on execution of the control program and reads the control program by a processer such as a CPU (central processing unit) and an MPU (Micro-Processing Unit) to execute, thereby enabling to execute various functions of the multifunction peripheral.

A transmitter information acquiring portion 51 of the control portion 5 acquires predetermined transmitter information for identifying a transmitter at a time of an incoming call of facsimile communication to cause storage means such as the RAM to store temporarily. As the transmitter information, at the time of the incoming call of the facsimile communication, a telephone number of the transmitter capable of being acquired from a TSI (Transmitting Subscriber Identification) signal defined in the facsimile communication is able to be used. In addition, as the transmitter information of an electronic mail, an address of the transmitter capable of being acquired from the electronic mail is able to be used. Furthermore, in internet facsimile communication, transmitter information capable of being acquired from the communication is able to be used.

A communication system in which the transmitter information acquiring portion 51 acquires the transmitter information is able to be determined in advance, and, for example, the telephone number of the transmitter is able to be acquired when there is an incoming call of the facsimile communication, the transmitter information is able to be set so as to be acquired at a time of an incoming call of either of the electronic mail or the internet facsimile, or, when there is the incoming call of communication corresponding to one or a plurality of these communication systems, the transmitter information may be acquired in accordance with the communication system. In addition, in a case where the predetermined transmitter information with which the transmitter is able to be identified by the communication system thereof is included, the transmitter information in accordance with the communication system may be acquired appropriately.

An electronic mail generating portion 52 generates, with respect to a transmitting destination which is set in advance, an electronic mail indicating that there has been an incoming call in the predetermined communication system such as the facsimile communication. The transmitting destination of the electronic mail is set appropriately according to operation input with respect to the operation portion 3. The electronic mail generated by the electronic mail generating portion 52 may be one that merely notifies that there has been an incoming call in the predetermined communication system, or may be one to which data received in the predetermined communication system is attached to be transmitted.

Based on the transmitter information acquired by the transmitter information acquiring portion 51 to be stored temporarily, a registered name retrieval portion 53 retrieves a registered name stored in association with the corresponding transmitter information from an address book stored in an address book storage area 71 of a storage portion 7.

At this time, in a case where a plurality of corresponding transmitter information are stored in the address book storage area 71, registered names stored in association with these plurality of transmitter information respectively are retrieved.

In a case where the plurality of registered names are retrieved by the registered name retrieval portion 53, a coincident part extraction portion 54 extracts a part which is coincident in common from these plurality of registered names. This makes it possible to extracts, from the plurality of registered names registered with respect to the same transmitter information, only a part which is common among all of the registered names.

The common part of the registered names extracted by the coincident part extraction portion 54 is reflected on the electronic mail generated by the electronic mail generating portion 52, and the common part is able to be output to a predetermined destination with the electronic mail. Moreover, in addition to the above-described common part, the electronic mail generating portion 52 is able to include all of the registered names retrieved by the registered name retrieval portion 53 into the electronic mail.

The control portion 5 which performs control for generating and transmitting the electronic mail and the communication portion 6 which transmits the electronic mail correspond to an output portion of the present invention.

Moreover, the transmitter information acquired from incoming communication in the predetermined communication system is able to be temporarily stored in the RAM and the like so as to be displayed on the display portion 1 according to predetermined user operation with respect to the operation portion 3, and, at this time, the common part of the registered names may be extracted by the coincident part extraction portion 54 to be displayed and output. In this case, the display portion 1 also corresponds to the output portion of the present invention. Alternatively, an output destination of the common part is able to be set as an external information processing apparatus such as a PC for outputting through the communication portion 6 and as portable storage means such as a memory card for outputting. In this case, a function part which realizes these of external output is also included in the output portion of the present invention.

The storage portion 7, which is for storing various information, is composed of storage means such as an HDD (Hard Disk Drive) and a flash memory. In the embodiment according to the present invention, the storage portion 7 is provided with the address book storage area 71 and a received information storage area 72.

In the address book storage area 71, transmitter information of a communication destination and a registered name associated with the transmitter information are recorded. Here, the address book is created according to the communication system in which the registered name retrieval portion 53 retrieves the transmitter information. For example, as the transmitter information, a telephone number of the transmitter capable of being acquired at a time of facsimile communication is able to be used. Moreover, an address of the transmitter capable of being acquired from an electronic mail is able to be used. Alternatively, in internet facsimile communication, the transmitter information capable of being acquired from the communication is able to be used. In the address book storage area 71, for example, 100 telephone numbers and registered names are able to be stored.

Moreover, in the received information storage area 72, data that the communication portion 6 receives through communication in a predetermined communication system, such as facsimile communication, and the like are stored. The stored data is, according to output setting set in advance, attached to an electronic mail by the electronic mail generating portion 52, displayed on the display portion 1, or appropriately output to an external device, an external memory and the like.

FIG. 2 is a view explaining an example of an address book stored in the address book storage area 71 of the storage portion 7. In the address book storage area 71, the transmitter information of the communication destination and an address book 10 in which a registered name 11 associated with the transmitter information is registered are stored. In this example, an example that the telephone number of the transmitter is registered as transmitter information 12 of the address book 10 is shown. The address book 10 is able to be registered in the address book storage area 71 of the storage portion 7 in advance by operation input by a user.

Here, for example, as shown in No. 02 to 05 of the address book 10, a plurality of different registered names may be registered with respect to one same telephone number, even though the registered names are for different sections of a same company, because of being stored in association with a representative telephone number of the company and the like. In the embodiment according to the present invention, a common part is able to be extracted from these registered names to be output.

FIG. 3 is a view showing an example of the electronic mail generated by the electronic mail generating portion 52. In the electronic mail generating portion 52, an electronic mail 20 for notifying that there has been an incoming call in the predetermined communication system is generated to be transmitted and output to the transmitting destination set by the user.

In this electronic mail 20, subject information 21 which includes information showing a transmission source of the communication is described. In this subject information 21, a subject of the electronic mail, the registered name extracted from the address book storage area 71, the telephone number which is the transmitter information are described. Here, for example, as shown in No. 02 to 05 of FIG. 2, in a case where the plurality of registered names are registered with respect to one same telephone number and this telephone number is extracted at a time of an incoming call of the communication, a common part of the plurality of registered names are extracted and only the common part is described. For example, in the example in No. 02 to 05 of FIG. 2, since only "aa company" is the common part, this common part is reflected on the subject information 21 to generate the electronic mail 20.

In this example, image data transmitted from the transmitter to the multifunction peripheral 100 in the predetermined communication system such as facsimile communication is able to be attached to the electronic mail 20 to be transmitted to the predetermined transmitting destination.

In the electronic mail 20, installation place information 22 of the multifunction peripheral 100, a file format 23 of the image data received by the multifunction peripheral 100 and resolution 24 thereof, a telephone number 25 of the transmitter who has transmitted the image data to the multifunction peripheral 100, and a registered name 26 extracted from the address book based on the telephone number of the transmitter are described.

Here, in a case where the plurality of registered names are registered with respect to the extracted telephone number of the transmitter in the address book, all of the registered names are described as the registered names 26. Moreover, when describing all of the registered names, since the common part of the plurality of registered names is described being reflected on the subject information 21, a part other than the common part may be described.

In this manner, even in a case where the plurality of registered names are registered with respect to the telephone number of the transmitter, only the common part of the registered names is extracted and reflected on the subject of the electronic mail to be output, so that it is possible to provide only reliable information to a receiver of the electronic mail without giving erroneous information. Moreover, in addition to the above-described common part, by describing all of the plurality of registered names which are associated with the telephone number of the transmitter in the electronic mail, it is possible to present all candidates for the transmitter, thus making it possible to improve convenience of the receiver.

Furthermore, in the example described above, the multifunction peripheral 100 transfers the received image data to the predetermined transmitting destination by attaching to the electronic mail, but may perform transmission by describing that the image data has been received in the electronic mail without attaching the received image data. In addition, though all of the plurality of registered names associated with the telephone number of the transmitter are described in the electronic mail, the description of all of the registered names may be omitted and, as to the registered names, only the common part thereof may be described.

In this example, an example that the electronic mail is used as a system in which the common part of the registered names is output is shown, however, instead of the electronic mail or together with the electronic mail, information similar to the electronic mail may be displayed on the display portion 1. Moreover, information similar to content described in the electronic mail may be output to a predetermined external device through the communication portion 6 and may be output to a portable memory such as a memory card.

FIG. 4 is a flowchart explaining an example of processing in the communication apparatus according to the present invention. This example shows an example that facsimile communication is prescribed as a predetermined communication system, and, upon an incoming call of the facsimile communication, transmitter information thereof is acquired to transmit an electronic mail on which a registered name associated with the transmitter information is reflected. The description will, hereinafter, be given for a flow of processing with reference to the configuration of FIG. 1.

First, when facsimile communication is received by the communication portion 6, the transmitter information acquiring portion 51 of the control portion 5 in the multifunction peripheral 100 determines whether or not transmitter information is acquired by a TSI signal included in the facsimile communication (step S1). Here, the transmitter information is set to be a telephone number of a transmitter.

In the case of acquiring the transmitter information in the facsimile communication, the registered name retrieval portion 53 compares first registered information in the address book and the received transmitter information (step S2), and retrieves whether the received transmitter information is coincident with the registered information (step S3). In each registered information of the address book, a telephone number which is transmitter information and a registered name which is associated with the telephone number are registered. In a case where the transmitter information received here is coincident with the telephone number of the compared registered information, the registered information, that is, the coincident telephone number and the registered name registered so as to be associated with this are taken out from the address book to be temporarily stored in storage means such as a RAM (step S4).

The registered name retrieval portion 53 then judges whether there is registered information which has not been compared among the registered information in the address book (step S5), and, in a case where there is registered information which has not been compared, the procedure returns to step S2 to perform comparison of the registered information which has not been compared and the received transmitter information. Moreover, in a case where the received transmitter information is not coincident with the registered information in the address book at step S3, the procedure moves to step S5 to judge presence or absence of the registered information which has not been compared.

In the above-described processing, for example, in a case where a telephone number of "0123456789" is received as the transmitter information at step S1, when performing comparison using the address book in FIG. 2, four piece of registered information of No. 02 to 05 are retrieved and temporarily stored.

In a case where there is no registered information which has not been compared at step S5, the registered name retrieval portion 53 judges whether or not there is coincidence between the transmitter information and the registered information in the address book (step S6). In a case where there is any coincidence, it is further judged whether or not a plurality of registered information are coincident (step S7). In a case where the plurality of registered information are coincident here, the coincident part extraction portion 54 detects whether or not there is a coincident part in common from the information of each registered name associated with the coincident telephone number (step S8).

For instance, in the example in FIG. 2, in a case where the transmitter information is the telephone number of "0123456789", "aa company, cc section, Mr./Ms. AA", "aa company, cc section, Mr./Ms. CC", "aa company, bb section, Mr./Ms. FF, dd company", and "aa company, Mr./Ms. GG" are retrieved in the address book as registered names correlated with this telephone number. The coincident part extraction portion 54 extracts "aa company" as a common part from these registered names. In the case of extracting a common part, it is possible to extract only a part which is perfectly coincident from the registered names, however, in addition, a rule may be established so that, for example, terms which are able to be equated in spite of having different expression and the like are regarded to be coincident. It may be established so that, for example, katakana and hiragana which have the same Japanese reading, or katakana and English are regarded to be coincident, or that "KABUSHIKIKAISHA" and "(KABU)" which is an informal writing thereof are regarded to be coincident, as well.

In a case where there is a part which is coincident in common among the plurality of registered names at step S8, when creating an electronic mail to be transmitted to a predetermined transmitting destination, the electronic mail generating portion 52 reflects the common part of the registered names on a subject of the electronic mail (step S9). The electronic mail generating portion 52 then describes all of the registered names correlated with the telephone number of the received transmitter information in text of the electronic mail (step S10). In this case, since the part which is common among all of the registered names is reflected on the subject, the text of the electronic mail may be described with the common part deleted from each registered name.

The electronic mail generating portion 52 then reflects the telephone number which is the transmitter information of the received facsimile communication on the subject of the electronic mail (step S11). To the electronic mail, by attaching data received through the facsimile communication, the data received through the facsimile communication is able to be transferred as transfer data. The electronic mail created in this manner is transmitted from the communication portion 6 to a predetermined destination (step S12).

Moreover, in a case where there are not a plurality of registered information in the address book which are coincident with the received transmitter information, the electronic mail generating portion 52 reflects the registered name of the coincident registered information on the subject of the electronic mail (step S14), and the procedure moves to step S11 to reflect the telephone number as the sender information on the subject of the electronic mail.

Furthermore, in a case where the transmitter information is not able to be acquired at step S1, since there is no transmitter information to reflect on the electronic mail, an electronic mail for reporting reception of the facsimile communication is created (step S13) to be transmitted.

By the above-described processing, even in a case where the plurality of registered names are registered with respect to the transmitter information, only the common part of the registered names is able to be extracted to be output by the electronic mail. Further, this makes it possible to provide only reliable information to the receiver without giving erroneous information.

Hereinabove, according to the present invention, it is possible to provide a communication apparatus capable of outputting only reliable information to a receiver without giving erroneous information even in a case where a plurality of names are registered with respect to transmitter information.

The invention claimed is:
1. A communication apparatus, comprising:
a communication portion for communicating with an external device;
a transmitter information acquiring portion for acquiring predetermined transmitter information for identifying a transmitter at a time of an incoming call of communication;
a storage portion for storing a registered name in association with the transmitter information in advance;

a registered name retrieval portion for, based on the transmitter information acquired by the transmitter information acquiring portion at the time of the incoming call of the communication, retrieving the registered name stored in the storage portion corresponding to the acquired transmitter information;

a common part extraction portion for, in a case where a plurality of registered names are retrieved with respect to the transmitter information acquired by the transmitter information acquiring portion when the registered name is retrieved by the registered name retrieval portion, extracting a common part among the plurality of registered names; and an output portion for outputting the common part of the registered names which is extracted by the common part extraction portion, in a predetermined system.

2. The communication apparatus as defined in claim 1, wherein
the transmitter information is telephone number information or address information included in information transmitted through the communication.

3. The communication apparatus as defined in claim 1, wherein
the output portion outputs all of the registered names retrieved by the registered name retrieval portion together with the common part extracted by the common part extraction portion.

4. The communication apparatus as defined in claim 1, wherein
the output portion outputs information including the common part among the registered names to a predetermined destination by using an electronic mail.

5. The communication apparatus as defined in claim 1, wherein
the output portion causes a predetermined display portion to display and output the information including the common part among the registered names.

* * * * *